US 11,481,374 B2

United States Patent
Marland

(10) Patent No.: US 11,481,374 B2
(45) Date of Patent: Oct. 25, 2022

(54) SYSTEMS AND METHODS FOR ANONYMIZING AND INTERPRETING INDUSTRIAL ACTIVITIES AS APPLIED TO DRILLING RIGS

(75) Inventor: Christopher Neil Marland, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 830 days.

(21) Appl. No.: 14/396,019

(22) PCT Filed: Apr. 25, 2012

(86) PCT No.: PCT/US2012/034877
§ 371 (c)(1),
(2), (4) Date: Oct. 21, 2014

(87) PCT Pub. No.: WO2013/162529
PCT Pub. Date: Oct. 31, 2013

(65) Prior Publication Data
US 2015/0112949 A1    Apr. 23, 2015

(51) Int. Cl.
*G06F 16/23*      (2019.01)
*G06F 16/242*     (2019.01)
(Continued)

(52) U.S. Cl.
CPC ...... *G06F 16/2322* (2019.01); *G06F 16/2365* (2019.01); *G06F 16/244* (2019.01);
(Continued)

(58) Field of Classification Search
CPC .......... G06F 17/30353; G06F 17/3053; G06F 17/30371; G06F 17/30412; G06F 17/3452;
(Continued)

(56) References Cited

U.S. PATENT DOCUMENTS 3,045,750 A    7/1962    Petters et al.
3,760,362 A    9/1973    Copland et al.
(Continued)

FOREIGN PATENT DOCUMENTS

WO    WO-2013/162529    10/2013

OTHER PUBLICATIONS

Esmael et al., "Automated System for Drilling Operations Classification Using Statistical Features", 11th International Conference on Hybrid Intelligent Systems (HIS) Dec. 5-8, 2011, pp. 196-199.*
(Continued)

*Primary Examiner* — Tony Mahmoudi
*Assistant Examiner* — Kamal K Dewan
(74) *Attorney, Agent, or Firm* — Benjamin Ford; Parker Justiss, P.C.

(57) ABSTRACT

Various systems and methods are disclosed for making and using an anonymized database for an industrial enterprise, such as oilfield operations. Providing statistical performance indicators for groupings of an activity in the oilfield allow for the information in confidential data sets to be shared without compromising the confidentiality of any one data entry. Comparisons may be made between or among oilfields with differing technologies, differing rig configurations, or even different crews when sufficient data are available.

14 Claims, 4 Drawing Sheets

(51) Int. Cl.
*G06F 16/2457* (2019.01)
*G06Q 50/02* (2012.01)
*G06Q 10/06* (2012.01)

(52) U.S. Cl.
CPC ... *G06F 16/24578* (2019.01); *G06Q 10/0639* (2013.01); *G06Q 50/02* (2013.01)

(58) Field of Classification Search
CPC .............. G06F 17/30705; G06Q 50/02; G06Q 10/0639
USPC ...... 707/688, 737; 702/6, 9, 133; 175/24, 50
See application file for complete search history.

(56) References Cited

U.S. PATENT DOCUMENTS

| | | | |
|---|---|---|---|
| 3,971,926 A | | 7/1976 | Gau et al. |
| 4,461,172 A | | 7/1984 | Mckee et al. |
| 4,559,610 A | | 12/1985 | Sparks et al. |
| 4,633,954 A | | 1/1987 | Dixon et al. |
| 4,676,313 A | | 6/1987 | Rinaldi et al. |
| 4,685,522 A | | 8/1987 | Dixon et al. |
| 4,721,158 A | | 1/1988 | Merritt, Jr. et al. |
| 4,738,313 A | | 4/1988 | Mckee |
| 7,584,165 B2 | | 9/2009 | Buchan |
| 8,676,721 B2 | | 3/2014 | Piovesan et al. |
| 2004/0040746 A1* | 3/2004 | Niedermayr | E21B 21/08 175/38 |
| 2005/0209912 A1* | 9/2005 | Veeningen | G06Q 10/06 705/7.12 |
| 2007/0199721 A1* | 8/2007 | Givens | G06Q 10/06 166/382 |
| 2007/0284147 A1* | 12/2007 | Moran | E21B 44/00 175/24 |
| 2008/0133194 A1* | 6/2008 | Klumpen | E21B 49/00 703/10 |
| 2008/0183415 A1* | 7/2008 | Dykstra | E21B 41/00 702/113 |
| 2008/0289876 A1 | 11/2008 | King et al. | |
| 2009/0020284 A1 | 1/2009 | Graf et al. | |
| 2009/0084545 A1* | 4/2009 | Banerjee | E21B 49/00 166/250.15 |
| 2009/0132458 A1* | 5/2009 | Edwards | G06N 5/025 706/50 |
| 2009/0194274 A1* | 8/2009 | Del Castillo | E21B 43/00 166/250.01 |
| 2010/0042458 A1* | 2/2010 | Rashid | G06Q 10/04 703/10 |
| 2010/0162402 A1* | 6/2010 | Rachlin | G06F 21/6254 726/26 |
| 2010/0235101 A1* | 9/2010 | Aamodt | E21B 44/00 702/9 |
| 2011/0016030 A1* | 1/2011 | Goodermote | G06F 21/6245 705/34 |
| 2011/0025525 A1 | 2/2011 | Akimov et al. | |
| 2011/0071963 A1* | 3/2011 | Piovesan | G06Q 10/00 706/11 |
| 2011/0155462 A1* | 6/2011 | Du Castel | G06N 5/022 175/24 |
| 2011/0166789 A1* | 7/2011 | Barrow | G06N 7/005 702/6 |
| 2012/0109526 A1* | 5/2012 | Conine | E21B 47/00 702/6 |
| 2012/0118637 A1* | 5/2012 | Wang | E21B 44/00 175/24 |

OTHER PUBLICATIONS

PCT International Search Report and Written Opinion, dated Jul. 12, 2012, Appl No. PCT/US2012/034877, "Systems and Methods for Anonymizing and Interpreting Industrial Activities as Applied to Drilling Rigs", filed Apr. 25, 2012, 8 pgs.
"AU Examination Report", dated Jan. 6, 2016, Appl No. 2867327, "Systems and Methods for Anonymizing and Interpreting Industrial Activities as Applied to Drilling Rigs," filed Apr. 25, 2012, 6 pgs.
"AU Patent Examination Report No. 1", dated Jun. 30, 2015, Appl No. 2012378288, "Systems and Methods for Anonymizing and Interpreting Industrial Activities as Applied to Drilling Rigs," filed Apr. 25, 2012, 4 pgs.
"PCT International Preliminary Report on Patentablility", dated Nov. 6, 2014, Appl No. PCT/US2012/034877, "Systems and Methods for Anonymizing and Interpreting Industrial Activities as Applied to Drilling Rigs", filed Apr. 25, 2012, 7 pgs.
"RU Office Action", Dated Nov. 2, 2015 Systems and Methods for Anonymizing and Interpreting Industrial Activities as Applied to Drilling Rigs filed Apr. 25, 2012, 6 pgs.
"RU Office Action", Apr. 18, 2016, Appl No. 2014139970, "Systems and Methods for Anonymizing and Interpreting Industrial Activities as Applied to Drilling Rigs," Filed Apr. 25, 2012, 8 pgs.
AU Examination Report No. 1, dated Jun. 30, 2015, Appl No. 2012378288, "Systems and Methods for Anonymizing and Interpreting Industrial Activities as Applied to Prilling Rigs," filed Apr. 25, 2012, 4 pgs.
RU Office Action, dated Nov. 2, 2015, Appl No. 2012378288, "Systems and Methods for Anonymizing and Interpreting Industrial Activities as Applied to Prilling Rigs," filed Apr. 25, 2012, 6 pgs.
CA Office Action, dated Jan. 6, 2016, Appl No. 2,867,327, "Systems and Methods for Anonymizing and Interpreting Industrial Activities as Applied to Prilling Rigs," filed Apr. 25, 2012, 6 pgs.
RU Office Action, dated Aug. 18, 2016, Appl No. 2012378288, "Systems and Methods for Anonymizing and Interpreting Industrial Activities as Applied to Prilling Rigs," filed Apr. 25, 2012, 17 pgs.
CA Office Action, dated Jan. 17, 2017, Appl No. 2,867,327, "Systems and Methods for Anonymizing and Interpreting Industrial Activities as Applied to Prilling Rigs," filed Apr. 25, 2012, 4 pgs.
Brown, T., et al., "In-Time Data Delivery," Schlumberger Oilfield Review, Winter 1999/2000, pp. 34-55.

* cited by examiner

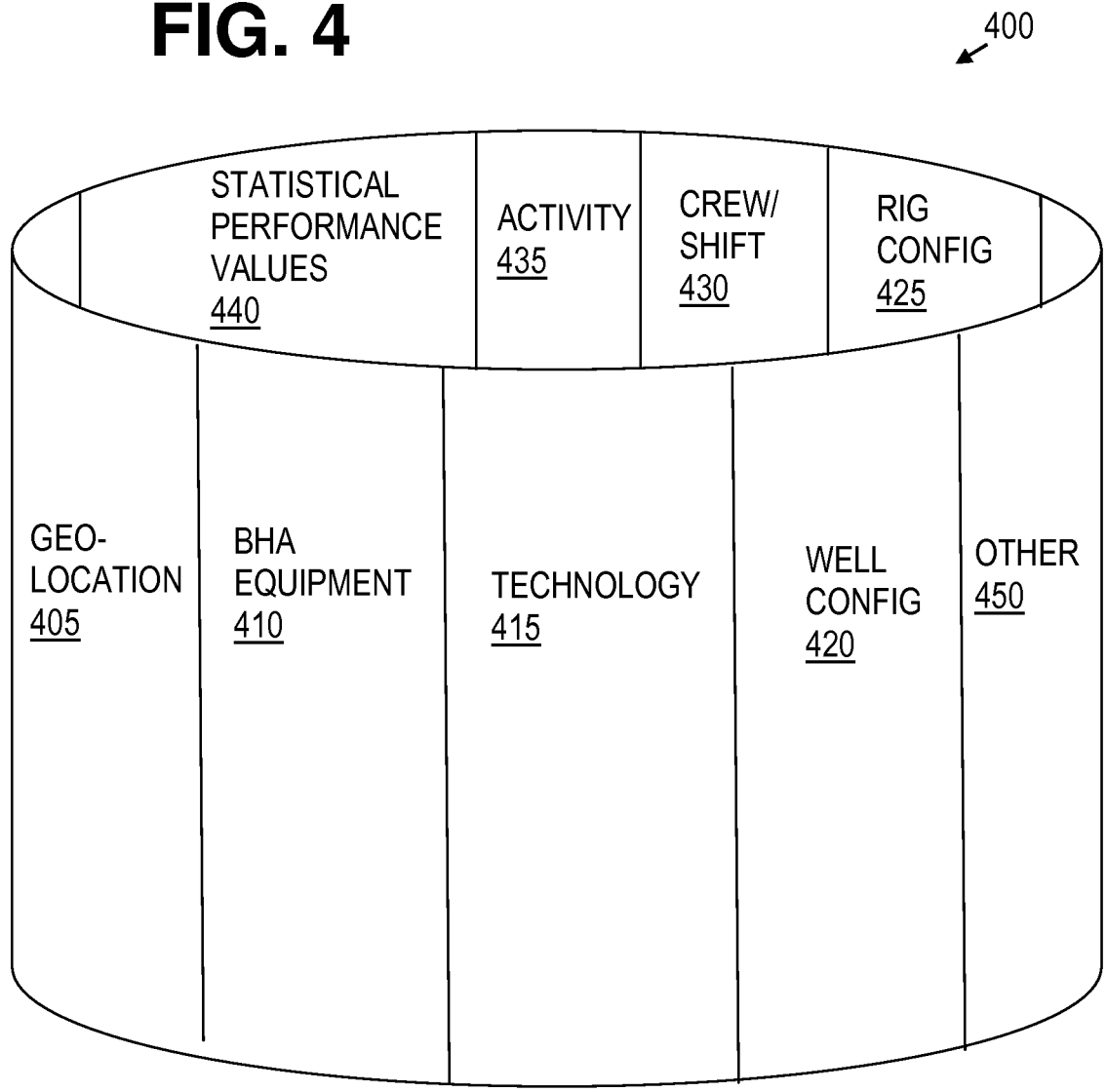

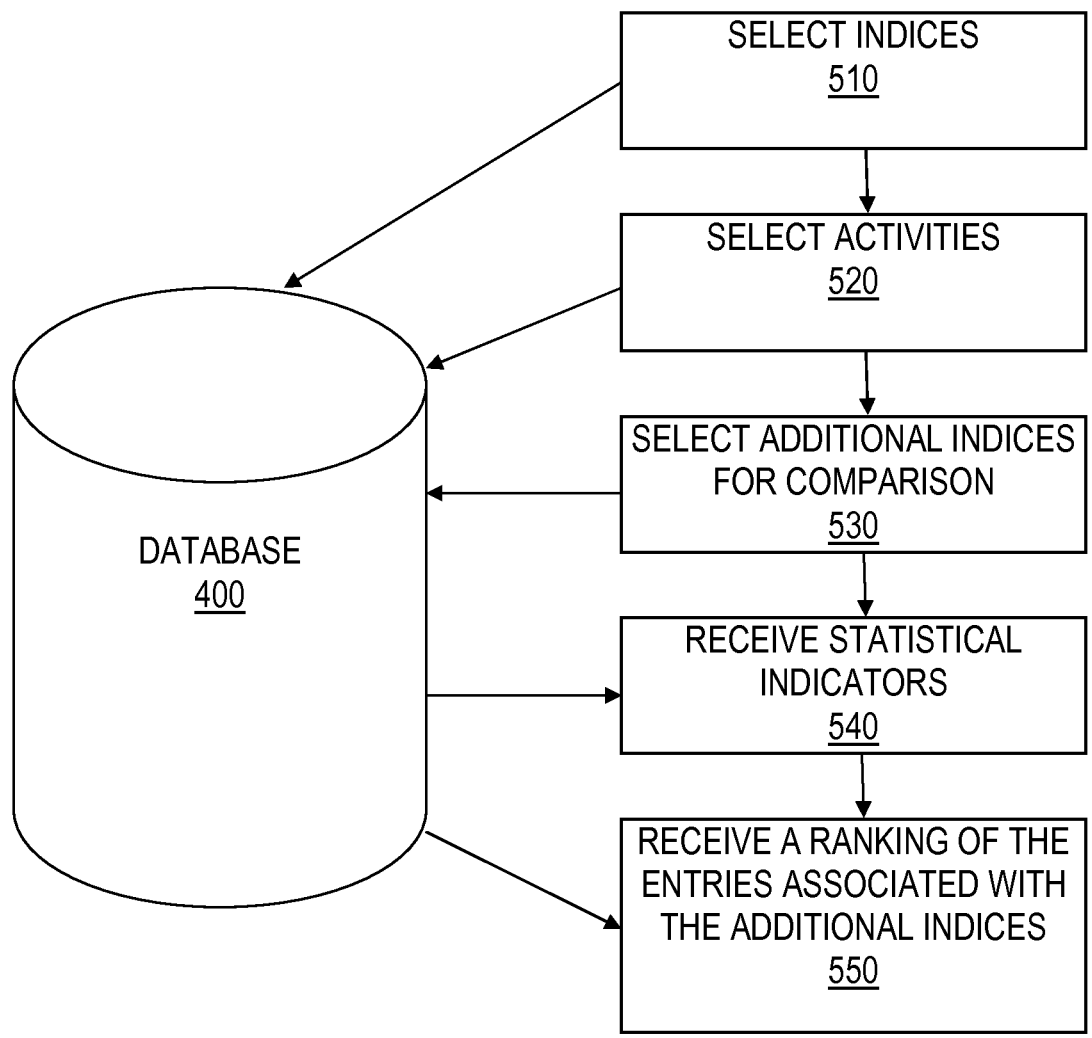

SYSTEMS AND METHODS FOR ANONYMIZING AND INTERPRETING INDUSTRIAL ACTIVITIES AS APPLIED TO DRILLING RIGS

BACKGROUND

In the quest for the variety of hydrocarbon reservoirs, companies employ many different equipment sets and staffing. These differences make comparisons between and among the different rigs and crews difficult. Cost and time are both important factors in choosing to use or change a particular drilling technique for a given field.

Traditional efficiency improvements focus on improving drilling rate, or rate of penetration (ROP) and decreasing non-productive time (NPT) as much as practical. There are other gross measures of productive activity, such as drilling time, BOP (blow out preventer) testing, and tripping time. These gross measures rely on manual data reporting, often from hand-written operator logs. These operator logs are confidential business documents and are not widely shared.

Currently there is no adequate system or method for anonymized systems and methods to classify industrial enterprises, such as well drilling activities, associated with detailed time logs, which can be optimized for better performance.

BRIEF DESCRIPTION OF THE DRAWINGS

An understanding of the disclosed embodiments can be obtained when the following detailed description is considered in conjunction with the drawings, in which:

FIG. 4 is a view of an illustrative database storing indicators and indices; and FIG. 5 is a flowchart illustrating a method of querying the illustrative database for comparison purposes.

Figure 1:
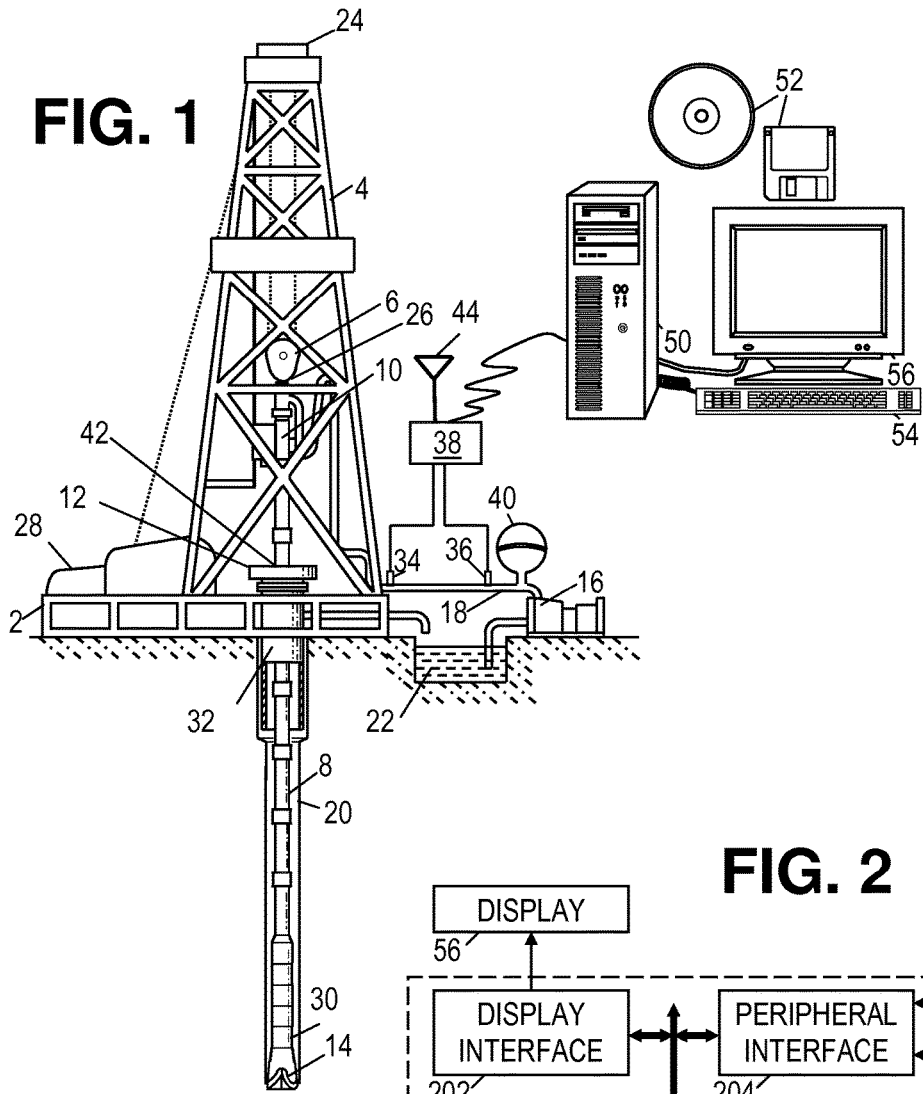
FIG. 1 shows an illustrative view of a rig set-up with data collection and storage.

While the invention is susceptible to various modifications and alternative forms, specific embodiments thereof are shown by way of example in the drawings and will herein be described in detail. It should be understood, however, that the drawings and detailed description thereof are not intended to limit the invention to the particular forms disclosed, but on the contrary, the intention is to cover all modifications, equivalents and alternatives falling within the scope of the appended claims.

DETAILED DESCRIPTION

Disclosed herein are various systems and methods for improving the performance of an industrial enterprise. In at least some forms, the industrial enterprise is embodied in drilling wells and the basic activities used in drilling any well. A method of providing a database of basic activities may include defining a set of performance operations. The performance operations are run against raw activity data to form performance indicators for each activity. Statistical indicators for each activity are generated by aggregating a plurality of performance indicators. The statistical indicators are stored on an accessible storage medium.

For a performance comparison with other industrial locations or situations, a performance index for an activity is generated by comparing a respective performance indicator to an expected value, such as an industry average. Weights can be applied to various activities to arrive at a weighted performance index average. By comparing across various alternatives, efficiency gains may be found resulting in recommendations for changes to, for example, equipment, crews, timing, or technology.

The disclosed embodiments can be best understood in the context of their environment. Accordingly, FIG. 1 shows an illustrative drilling rig as an exemplary industrial enterprise. A drilling platform 2 is equipped with a derrick 4 that supports a hoist, which typically includes a stationary crown block and a traveling block 6. Rig operators drill oil and gas wells using a string of drill pipes 8. The traveling block 6 suspends a top drive 10 that is used to rotate the drill string 8 and to lower the drill string through the wellhead 12. Connected to the lower end of the drill string 8 is a drill bit 14. The drill bit 14 may also be rotated and drilling accomplished by rotating the drill string 8 by use of a downhole motor 30 near the drill bit, or by both the top drive 10 and the downhole motor 30.

Recirculation equipment 16 pumps drilling fluid through supply pipe 18, through top drive 10, and down through the drill string 8 at high pressures and volumes to emerge through nozzles or jets in the drill bit 14. The drilling fluid then travels back up the hole via the annulus formed between the exterior of the drill string 8 and the borehole wall 20, through a blowout preventer 32, and into a retention pit 22 on the surface. On the surface, the drilling fluid is cleaned and then recirculated by recirculation equipment 16. The drilling fluid cools the drill bit 14, carries cuttings from the base of the bore to the surface, and balances the hydrostatic pressure in the rock formations.

The bottom hole assembly (i.e., the lowermost part of drill string 8 near the downhole motor 30) includes thick-walled tubulars called drill collars to add weight and rigidity to aid the drilling process. The thick walls of these drill collars make them useful for housing instrumentation and LWD (logging while drilling) sensors.

Sensors on the surface at the drilling rig may include pressure sensors, speed, torque, rate sensors, and location sensors used to measure or count distances or the number of pipe joints made up. As examples of surface sensors, crown block load cell 24 may be a pressure transducer mounted on the crown block to detect the weight on the hoist at the top of the derrick 4. Traveling block load pin sensors 26 may be pressure transducers to detect the weight on the traveling block pins connecting the travelling block 6 to the top drive 10. Measurements of how much drill pipe 8 is in the well bore 20 may be made using a draw works sensor 28 that measures the distance the traveling block 6 or the top drive 10 moves up and down. Alternatively or in addition, a laser or ultrasonic sensor 42 may count changes along each joint to determine how many drill string 8 sections of drill pipe are in the well bore 20. In addition, the top drive 10 speed and torque may be monitored (not shown).

Other surface sensors may include pressure transducers 34, 36, shown wired to a data acquisition unit 38. For analog sensors, the data acquisition unit 38 may act like a digitizer, converting analog signals into digital signals for computer storage, manipulation, and retrieval. Other surface sensors (not shown in the drawings) may include sensors for measuring standpipe pressure, fluid pump flow rate and pressure, and cement pump flow rate and pressure. Other information, such as BHA length and the borehole geometry, may also be measured or input to a data set. From the various sensor readings, the depth of the well, the depth of the bit, rate of penetration (ROP), and the weight on bit (WOB) may all be calculated, among other values.

The data acquisition unit 38 may include an antenna 44 for receiving wireless sensor signals as well as wired sensor signals, illustrated by the fluid pressure sensors 34, 36. While not all shown in the figures, the sensors may use a wired configuration or a wireless configuration.

A computer 50 or some other form of a data processing device is coupled to receive data, including sensor data, preferably digital data, from the various sensors and/or the data acquisition unit 38. Computer 50 operates in accordance with software (which may be stored on information storage media 52) and user input received via an input device 54 to process and decode the received signals. The resulting decoded data may be further analyzed and processed by computer 50 to generate a display of useful information on a computer monitor 56 or some other form of a display device. For example, a driller could employ this system to obtain and view time-dependent data from the well-drilling operation. The computer 50 could also be used to query and display results from manipulated data, as will be described below. While the computer 50 is shown at the well site, in other embodiments, the computer 50 is remote from the well site.

Figure 2:
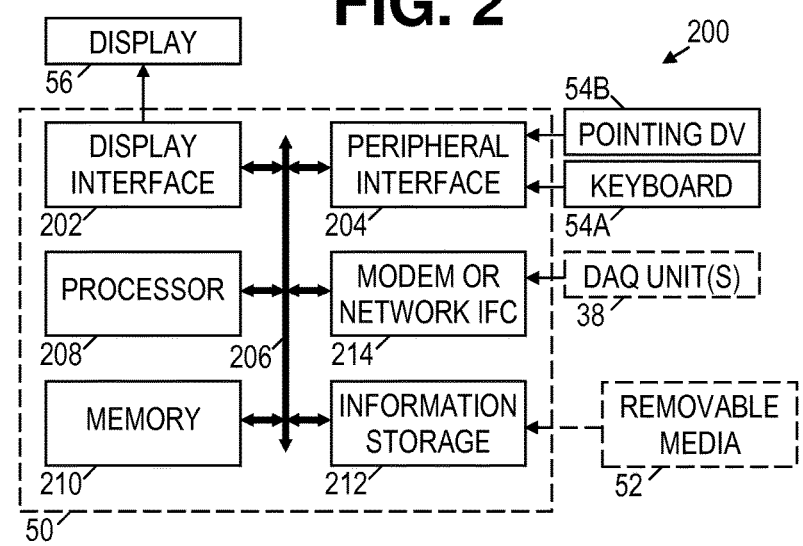
FIG. 2 is a functional block diagram of a computer system for operating software according to various embodiments.

FIG. 2 is a functional block diagram of a computer system 200 for operating software according to various embodiments. The computer system 200 is illustrated as being equipped with the computer 50, shown at the well site in FIG. 1, solely for ease of illustration. The computer system 200 may include one or more buses 206 through which one or more processors 208 are coupled to a memory (RAM) 210, a display interface 202, a peripheral interface 204, one or more modems or network interfaces 214, and one or more types of information storage 212, such as hard drives. The display 56 is coupled to the display interface 202. Input devices 54, such as a keyboard 54A and a pointing device 54B, are coupled to the peripheral interface 204. One or more data acquisition units 38, such as the data acquisition unit 38 shown in FIG. 1, are coupled to the one or more modems and network interfaces 214. A removable media 52 may be coupled to the information storage 212.

Instructions from software stored on the information storage 212, and optionally the removable media 52, are performed by the processor 208 to operate on raw or manipulated sensor data from the various sensors from an industrial enterprise, such as the rig operations shown in FIG. 1.

The raw data from the various sensors shown in FIG. 1, and similar sensors at other industrial enterprises, are typically stored in information storage 212 as flat files of sensor values as a function of time. The sensor values may be scaled or raw from the sensor itself. Typically in a header to the file, or in an associated file or title, information about when, where, and how the sensor data was collected is stored. Additional information being stored may include technology being used, sensor type, type of industrial enterprise, etc. The raw data for any given well may be obtained directly from sensor data, from an ASCII import, or from another database, source, or format, such as WITS (Wellsite Information Transfer Specification), WITSML (WITS Markup Language), Profibus format, etc.

According to one embodiment, the industrial enterprise of drilling a well may be subdivided into a series of activities that represent basic sets of actions taken during the industrial enterprise. For working in a well, the representative activities may include: time to make up and lay down the bottom hole assembly, the total connection time, the testing time for the BOP, the time to run riser and BOP, and the time to pull the riser and BOP. Other activities while drilling may also be defined, such as time from off bottom to in slips, in slips time, out of slips to back on bottom time, time circulating off bottom, total drilling time (including off bottom time), total drilling time (slips to slips), on bottom to off bottom time, reaming time, reaming to drilling ratio, circulating to drilling ratio, and non-drilling to drilling ratio. For tripping a well, other activities may include, drill pipe slips time, drill pipe run time per stand, drill pipe casing total time, casing in slips time, casing total time per joint, and drill pipe stands or singles rate.

In one embodiment, an illustrative activity may be defined by the following:

Activity Definition=If (Depth $A$>Depth $B$) AND (Parameter 1<Threshold) AND (Parameter 2<Threshold) AND (Parameter 3>Threshold) AND (Parameter $n$<Threshold).

Note that an activity may be associated with or measured with the data from a single or multiple sensors. Times and rates for various activities may be extracted from the data from a single sensor or from multiple sensors.

Figure 3:
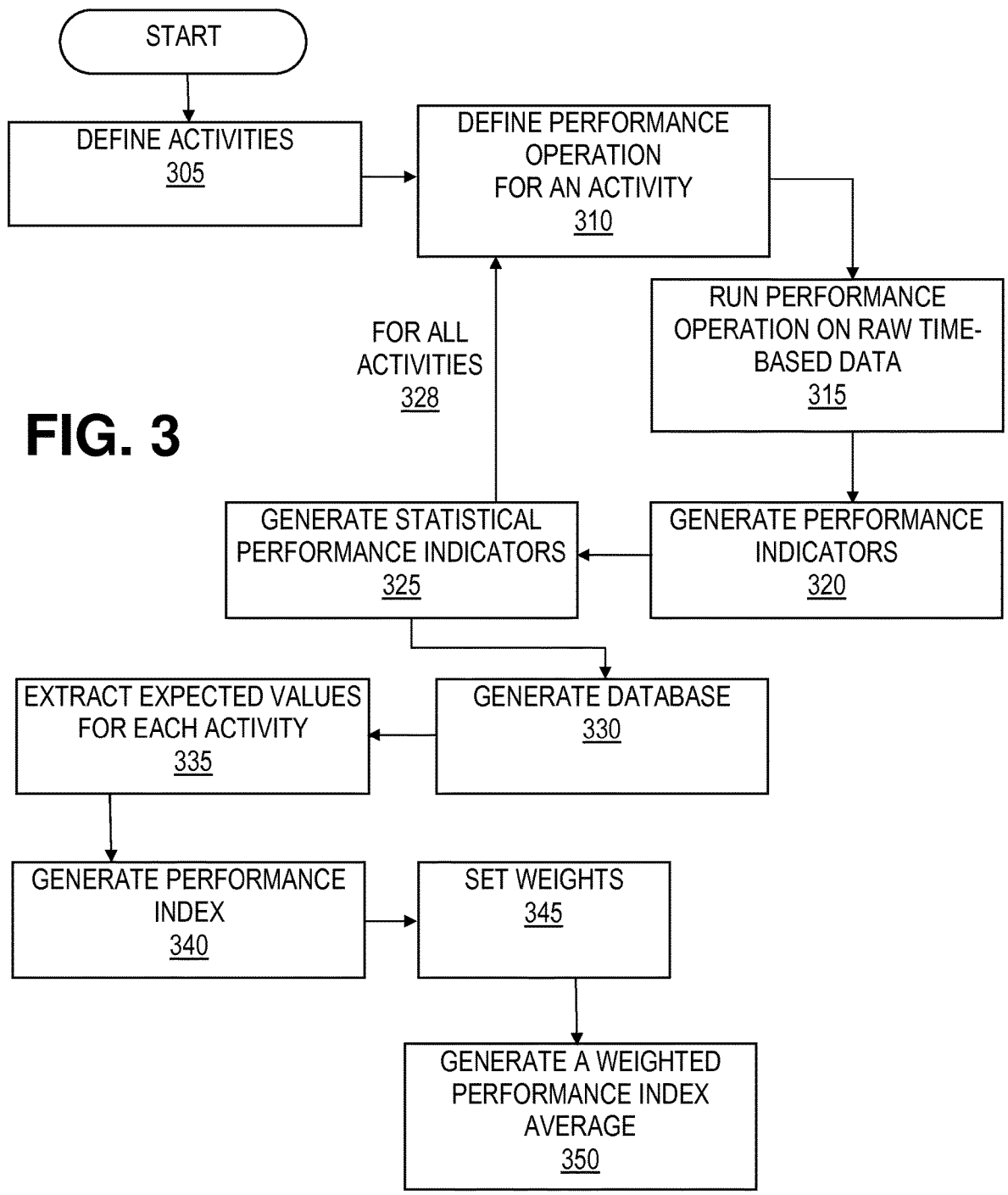
FIG. 3 is a flowchart illustrating converting raw data to performance indicators and statistical indicators.

Turning to the flowchart of FIG. 3, an embodiment of the process of converting raw data to performance indicators and statistical indicators is shown. The process starts by defining one or more activities for the industrial enterprise at 305. For example, for the activity of the testing time for the BOP, the activity has a start time and an end time for the actions that make up the testing of the BOP, actions well defined in the art of well drilling Based on block weight sensor and block height sensor change, typically indicated by an increase in the block weight and a block height increasing to lift the BOP, the starting time may be identified. Likewise, the ending time may be identified by completion of the final pressure testing of the BOP once located at the wellhead. This may be identified through final pressure release measured by pressure sensors located on high pressure pumping units such as that of the cement unit.

In the example above for defining the running and testing of BOP, the activity and its start time could be defined in the following manner:

BOPRun Start Time=If (Current Casing Depth<$Rig$ Floor Height) OR (Current Casing≠Riser) AND (Block Weight>Threshold) AND (Block Movement=$Up$)

{Block Weight Threshold may be defined by the expected weight of the BOP+safety margin}

BOPRun End Time=If (Block Weight<Threshold) AND (Pressure Test$_n$<Threshold)

Where n=Number of Pressure Test to be conducted

An example of an activity that is defined by a rate is the number of casing joints connected and run into the wellbore in a given time period, e.g., one hour. Based on the block height, block weight and block direction sensors, the starting time may be defined in the following manner:

Casing joints/$hr$: Start Time=If (Block Height<Threshold) AND (Block Weight>Threshold AND (Geometry Definition=Casing)

Casing joints/$hr$: End Time=If (Casing Depth=Hole Depth) AND (Cement Pump Pressure<Threshold) OR (Cement Pump Flow<Threshold)

{Block Height Threshold may be defined as a casing joint length+sensor error margin}

{Block Weight Threshold may be defined as the weight of the blocks+sensor error margin}

{Geometry Definition is a definition of the type of equipment being used at that time. It may reflect bottom hole assembly, drillpipe, casing or other equipment. It may be manually entered into the database}

{Cement Pump Pressure Or Flow Threshold may be defined as zero or zero+sensor error margin}

In the example for rate, each individual casing joint will have a time associated with it which can be prorated to define a rate of casing joints per time period. At the end of the entire activity the statistical calculation will define the overall number of casing joints per time period, typically per hour.

A user may define a custom activity which may be defined either through algorithm definition or by grouping activities together. An example of a custom activity may include a definition for non-productive time (NPT) while in a drilling phase. This activity may be defined as any time spent not drilling from the first time the bit touches bottom after a drilling connection to the time picking up off bottom prior to making a connection. The activity may be defined in the following manner:

$$NPT\text{Activity Start Time} = \text{If (Hole Depth}-\text{Bit Depth} > 0) \text{ AND (Distance Drilled from last connection} < \text{Stand Length)}$$

$$NPT\text{Activity End Time} = \text{If (Hole Depth}-\text{Bit Depth} = 0)$$

In this example, the time spent off bottom would be calculated and each NPT activity that is measured during the drilling of a stand would be totaled to provide a total NPT for each stand of drillpipe used to drill with. The total time would be defined by:

$$\text{Total } NPT\text{per stand Time} = \text{Sum } (NPT\text{Activity Start Time}_1 - NPT\text{Activity End Time}_1) + (NPT\text{Activity Start Time}_2 - NPT\text{Activity End Time}_2) + (NPT\text{Activity Start Time}_n - NPT\text{Activity End Time}_n)$$

In this example, the NPT times will be zeroed when the process determines that the parameters that define a connection of drillpipe has been made or the distance drilled is equivalent to the stand length.

Once the activities of interest are defined at 305, the process defines a performance operation for each activity at 310. For example, for the activity of the testing time for the BOP, Performance may be defined either through use of industry standards, historical performance measurement, or manufacturer specific time expectations where these exist for specific equipment such as a BOP. The process then runs the performance operation on raw time-based data at 315 to generate a performance indicator for the activity, at 320. Once a sufficient plurality of performance indicators have been generated for a given activity, the process generates a statistical performance indicator at 325. The process loops through all activities of interest at 328, those activities defined at 305. Note that the determination of a performance indicator may be performed over any time period required and may include, but not be limited to, hourly, daily, weekly or per an irregular time period such as that required to complete a specific section, run or an entire well. The results provide the actual efficiency for each activity over the period of time the determination was performed.

After the statistical indicators have been generated, a database of the statistical indicators may be generated, at 330. The database of statistical indicators has the advantage of having anonymous data while being formed from confidential, proprietary information. This anonymous data may allow for comparisons with others' work without sacrificing the confidential, proprietary nature of the raw data.

Once a sufficient numbers of performance indicators have been generated at 325 and formed into a database at 330, the process may extract expected values for each activity at 335. The expected value for an activity may be an average across all indices for the activity. The expected value may also be defined by a user across a selected set of indices for a personalized expected value for an activity. In another embodiment, the expected value may also be a value determined from outside the database. For example, the expected value may be a benchmark, a set time, range or number of activities per time period that defines required or acceptable performance for a particular activity. A performance benchmark can be assigned to any activity that can be measured in time or any activity that can be measured by the number of events over any given time period. This can include median time, target time, upper and lower quartile time, etc.

The process may generate a performance index by automatically comparing actual performance to the expected value at 340. The performance index may be a percentage index. Examples of formulas that may be used to define a percentage performance index include:

$$PI\% = (BP/MP) \times 100 \text{ for time based activities}$$

$$PI\% = (MP/BP) \times 100 \text{ for activity actions } per \text{ time period}$$

where PI %=Percentage Performance Index; MP=Measured Performance; BP=Benchmark Performance The calculation of a percentage performance index for each activity provides a user with a direct measurement of performance and therefore an understanding of the efficiency of each activity. The calculation also enables the user to apply a cost to the rig time. This cost may be used to translate activity time or rate and the percentage performance index into both an estimate of planned cost, actual cost and therefore cost saving. The relationship to cost provides any user, even those unfamiliar with the particular well or rig, with a measure of the total cost of the inefficiencies for each activity that can be measured. Application of time, cost, and the percentage performance index will improve the time estimates for rig planning as it will account for actual performance. Variance may also be entered or determined internally to better predict bounding estimates, such as upper and lower percentiles. Using measurements of performance for each activity and for an entire well's activities may improve the cost budgeting for upcoming projects. Refinements and improvement in cost estimation may improve project economic predictions and variance and may therefore speed budgetary approval processes.

Note that once inefficiencies have been identified and corrective action taken, performance should improve Improvements may be determined by the software running on the processor and used to redefine the expected values against which performance is being measured.

The process may also provide for setting weights for the various activities in the performance index at 345. Using unequal weights may allow for better comparisons between and among different versions of the industrial enterprise. With weights set, a weighted performance index average (WPIA) may be generated at 350. In one embodiment, the time of interest is the time for the entire enterprise to be completed. For well drilling, the total time for drilling the well could be used.

The use of the WPIA may allow for comparing performance using a set of default comparison activities that are common to all enterprise operations, e.g. drilling a well. This comparison provides a way of comparing performance where operations vary from hours to days and where the type of wells, rigs, fields etc would typically preclude comparison. This comparison uses the predefined activities percentage performance index and Total Time over the entire well to normalize performance. The WPIA is calculated with the following formula:

$$WPIA\ \% = ((PI1 \times T1)+(PI2 \times T2)+(PIn \times Tn))/(T1+T2+Tn)$$

Where:
PI1=Activity (Performance Index (PI %)
T1=Total Time performing Activity 1
PI2=Activity 2 Performance Index (PI %)
T2=Total Time performing Activity 2
PIn=Activity n Performance Index (PI %)
Tn=Total Time performing Activity n The WPIA may enable automated normalization and comparison of an entire well performance by standardizing activity detection, measurement, and normalization. The WPIA may enable the automated comparison across fields, assets, regions, etc., from the anonymized database. Individual asset performance along with average performance across the entire asset may be provided. Therefore, an automated view of best and worst performing assets, fields, etc., as well average weighted performance for the entire group of assets, fields, etc., may be compared to the desired expected value.

Turning to FIG. 4, a graphical description of the novel anonymous database 400 storing statistical indicators and indices for selecting among the various indicators is shown. The statistical performance values 440 of the various activities 435 are the central points of the database 400. Stored in the database 400 configured with functional relationships to a variety of inter-related indices, the statistical performance values 440 and the activities 435 allow for queries to compare the performance of a new industrial location across the database 400. Various exemplary indices shown include geo-location 405, bottom hole assembly equipment 410, technology 415, well configuration 420, rig configuration 425, crew and/or shift 430, and other index 450. Note that a geo-location 405 may refer to a surface location 405 or a sub-subsurface location 405, such as a specific production field.

Turning to FIG. 5, a flowchart of a method of querying a database, such as the database 400, for comparison purposes is shown. The database 400 preferably includes a plurality of indices related to the circumstances under which the activities in the database 400 were performed. The method includes selecting one or more indices, at 510. The method also includes selecting one or more activities, at 520. The method allows for the selection of additional indices used for comparison purposes, at 530. The method provides statistical indicators, at 540. The provided statistical indictors may be aggregated over the original indices from 510, the additional indices at 530, or those indices in the database 400 but neither selected in 510 nor 530. The method generates a ranking of the entries associated with the additional indices, at 550. The ranking may be received by a user at 550 after generation.

In one embodiment, the database 400 includes the raw data from which that the statistical performance values are derived. In this embodiment, the raw data are not directly accessible by query. Instead, one or more indices are selected to index one or more activities. The database engine would then check for an anonymizable number of corresponding entries or respective performance indicators before determining and returning the statistical performance indicators requested. The standard for the minimum number of entries required for anonymity can be set as low as one more than the minimum number needed to define the statistical performance indicator. When any given available index is not selected, then that index's entries are statistically averaged into the resulting statistical performance indicator.

One of ordinary skill in the art having the benefit of this disclosure would understand that a database query engine is an example of a software package that could be run on the computer system 200. In another embodiment, the query engine could be a specialized processor 208 of the computer 50. Both the process(es) and/or the method(s) described herein may be implemented in software that runs a processor, such the processor 208, which may be a general purpose processor 208 or a specialized processor 208.

Numerous variations and modifications will become apparent to those skilled in the art once the above disclosure is fully appreciated. For example, performance may be tracked and compared across multiple assets. The disclosed embodiments provide the ability to automatically combine results from many drilling sequences into a single anonymized performance database. These results may be combined on multiple levels, e.g. by hole section size, individual bit run or for the entire well. Automating and combining the measured results enables automated comparative performance analysis for any activity. Such analysis can be performed at any scale, e.g. rig assets, field, or geographical range. It is intended that the following claims be interpreted to embrace all such variations and modifications.

What is claimed is:
1. A method comprising:
defining activities in an oilfield in terms of a start time and an end time of each activity;
converting, using a processor and a network interface, raw activity data from sensors into performance indicators for the activities, wherein said converting includes:
determining the start and end times of the activities by decoding and extracting some of the raw activity data that correspond to some of the sensors associated with actions that make up the activities and comparing the extracted raw activity data to corresponding data thresholds; and
running predefined performance operations against the start and end times of the activities
setting an anonymity threshold that defines a minimum number of the performance indicators required for anonymity;
aggregating the performance indicators to generate anonymized statistical indicators, based on the anonymity threshold, for the activities;
storing the anonymized statistical indicators for the activities into a database using the processor;
generating a performance index for each of the activities by automatically comparing, using a database query engine, a measured performance of the each of the activities to a respective benchmark value extracted from the anonymized statistical indicators in the database; and
recommending a change of at least one of; equipment, crews or technology associated with at least one of the activities based on the comparison.

2. The method of claim 1, further comprising:
generating a weighted performance index average of the oilfield based on the performance indices for some of the activities that are common to other oilfields and a time to perform each of the some activities; and comparing a performance of the oilfield to performances of the other oilfields using the weighted performance index average.

3. The method of claim 2, further comprising:

assigning a weight for each of the performance indices for the some activities.

4. The method of claim 2, wherein the weighted performance index average includes the activities of time to make up and lay down bottom hole assembly, total connection time, rate of installing drill pipe singles, rate of installing casing stands, rate of casing joints, time to test blow out preventer, time to run riser and blow out preventer, and time to pull riser and blow out preventer.

5. The method of claim 2, wherein the performance index average includes a user-defined activity.

6. The method of claim 1, wherein the activities in the set includes one or more activities taken from the group consisting of in-slips time, off bottom to in-slips time, on bottom to on bottom time, drill pipe trip time inside casing, drill pipe trip to in-slips time, drill pipe singles trip time inside casing, and drill pipe trip rate.

7. A method comprising:

selecting at least an indication of one or more indices within a database;

selecting at least an indication of one or more activities of oilfield operations within the database, wherein each of the activities is defined as a start time and an end time of the each activity;

receiving a plurality of anonymized statistical indicators associated with the one or more indices and the one or more activities of the oilfield operations, wherein the anonymized statistical indicators are generated based on an anonymity threshold that defines a minimum number of performance indicators of the activities required for generating the anonymized statistical indicators, wherein the performance indicators are converted, using a processor and a network interface, from raw activity data of sensors by:

determining the start and end times of the activities by decoding and extracting some of the raw activity data that correspond to some of the sensors associated with actions that make up the activities and comparing the extracted raw activity data to corresponding data thresholds; and running predefined performance operations against the start and end times of the activities;

generating a performance index for each of the activities by automatically comparing, using a database query engine, a measured performance of the each of the activities to a respective benchmark value extracted from the anonymized statistical indicators;

generating a weighted performance index average of a first oilfield of the oilfield operations based on the performance indices for some of the activities that are common to all of the oilfield operations and times to perform the some activities; and comparing a performance of the first oilfield to performances of other oilfields using the weighted performance index average.

8. The method of claim 7, the method further comprising:

selecting one or more indices for comparison based on said selecting at least the indication of the one or more indices within the database and based on said selecting at least the indication of the one or more activities within the database; and receiving a ranking of entries associated with the one or more indices selected for the comparison based on the associated anonymized statistical indicators.

9. A method, the method comprising:

defining a custom activity of oilfield operations a start time and an end time of the custom activity;

selecting, using a database query engine, at least an indication of one or more indices within a database;

storing anonymized statistical indicators for the custom activity of the oilfield operations on an accessible storage medium, wherein the anonymized statistical indicators are generated based on an anonymity threshold that defines a minimum number of performance indicators required for generating the anonymized statistical indicators, and the performance indicators are converted, using a processor, from raw activity data of sensors by:

determining start and end times of the custom activity by decoding extracting some of the raw activity data that correspond to some of the sensors associated with actions that make up the custom activity and comparing the extracted raw activity data to corresponding data thresholds; and running predefined performance operations against the start and end times of the custom activity;

receiving the anonymized statistical indicators for the custom activity of the oilfield operations;

generating a performance index for the custom activity by automatically comparing, using the data query engine, a measured performance of the custom activity to a benchmark value extracted from the anonymized statistical indicators; and recommending a change of at least one of; equipment, crews or technology associated with the custom activity based on the comparison.

10. The method of claim 9, further comprising:

selecting one or more indices for comparison based on said selecting at least the indication of the one or more indices within the database and based on the custom activity of the oilfield operations; and receiving a ranking of entries associated with the one or more indices selected for the comparison based on the associated anonymized statistical indicators.

11. The method of claim 9, further comprising:

generating a weighted performance index average by weighting each activity for a project and combining together the performance index for each activity in the project.

12. The method of claim 11, further comprising:

assigning a weight for each activity.

13. The method of claim 11, wherein the weighted performance index average includes the activities of time to make up and lay down bottom hole assembly, total connection time, rate of installing drill pipe singles, rate of installing casing stands, rate of casing joints, time to test blow out preventer, time to run riser and blow out preventer, and time to pull riser and blow out preventer.

14. The method of claim 9, wherein the activities include one or more activities taken from the group consisting of in-slips time, off bottom to in-slips time, on bottom to on bottom time, drill pipe trip time inside casing, drill pipe trip to in-slips time, drill pipe singles trip time inside casing, and drill pipe trip in stands rate.

* * * * *